Jan. 23, 1968   V. F. VOLK   3,365,534
COAXIAL CABLE AND METHOD OF MAKING
Filed Feb. 6, 1967
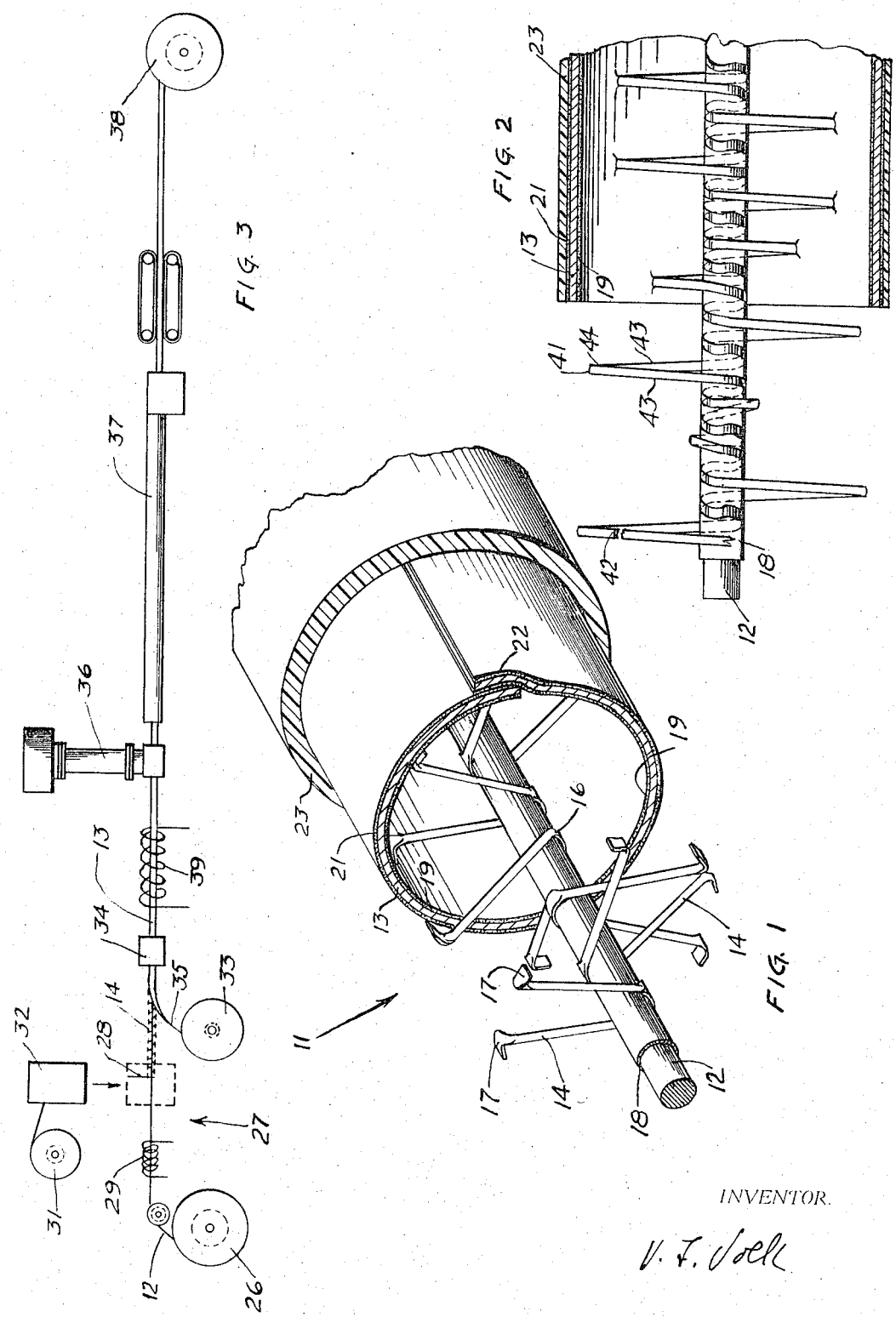
INVENTOR.
V. F. Volk

3,365,534
COAXIAL CABLE AND METHOD OF MAKING
Victor F. Volk, New York, N.Y., assignor to Anaconda Wire and Cable Company, a corporation of Delaware
Filed Feb. 6, 1967, Ser. No. 614,133
21 Claims. (Cl. 174—29)

ABSTRACT OF THE DISCLOSURE

In a coaxial cable the inner conductor is suspended from the outer conductor by tensile strands that are adhesively bonded to the latter.

Background of the invention

This invention pertains to the field of art of coaxial cables used for transmission of electrical signals. As used in this application a coaxial cable has a central conductor which is usually solid but may also be tubular and an outer tubular conductor concentric to the central conductor and spaced therefrom, with the space between the two conductors having high electrical resistivity and low dielectric constant.

In prior art coaxial cables the outer conductor is supported on dielectric spacers that are mounted on the inner conductor; or on an expanded, foam-type, layer of insulation that is extruded over the inner conductor. The spacers may take the form of a ribbon or tube that is wrapped around the inner conductor, but the type of coaxial cable most widely used for telephone service has cylindrical blocks of polyethylene spaced along the inner conductor to support the outer conductor.

In 1937 the German magazine, "Hochfrequenztechnik," published a description by Dr. Otto Cords of a concentric cable with the central conductor suspended by threads which were, in turn, tied to a "supporting structure" consisting of several coils of wire and metal strip. The cost and intricacy of this German cable precluded its general adoption as did, also, the fact that the suspending silken threads had a high dielectric constant themselves and would introduce an element of hygroscopicity.

Compared to prior art cables my present cable can be manufactured at high speed and low cost and need include no elements that are either hygroscopic or have a high dielectric constant.

Summary

My invention comprises a coaxial cable with the inner conductor supported by flexible strands that are preferably formed from a low dielectric-constant material such as polypropylene or polyethylene and are adhesively bonded to the inner conductor. In one preferred embodiment of my invention the suspending strands comprise individual U-shaped members, and in another preferred embodiment they comprise segments of a plurality of loops of a continuous filamentary member wherein one end of each of the loops supports the inner conductor.

I have also invented the method of forming a coaxial cable by continuously advancing a central conductor of indefinite length, radially extending a plurality of tensile members around the entire circumference of the conductor so that it is supported on all sides, continuously forming a tubular outer conductor around the central conductor and the supporting tensile members and adhesively bonding the tensile members to the outer conductor to support the central conductor within the cable. The tensile members may be made by forming a plurality of U-shaped dielectric members, each having a central arc and two projecting legs, and bonding the arcs onto the advancing conductor. In another method of my invention I wind a continuous dielectric strand in a series of loops forming a pattern having the conductor in the center, as shall be hereinafter more fully explained, around the central conductor and bond the extremities of the loops to the outer conductor.

The practice of my process may include the step of applying adhesive to substantially the entire surface of the inner conductor and/or outer conductors and where a heat sensitive adhesive is used, heating the conductor to form a bond. The heating may be performed inductively.

The cable of my invention has a lower effective dielectric constant than prior art cables, and requires less of the dielectric spacing material since it stresses the material in tension rather than compression.

Brief description of the drawing

In the drawing:
FIGURE 1 shows a pictorial view of one embodiment of the cable of my invention.
FIGURE 2 shows a side view, partly in section, of another embodiment of the cable of my invention.
FIGURE 3 diagrammatically illustrates the steps of a method of making the cable of my invention.

Description of the preferred embodiments

In FIGURE 1 the coaxial cable 11 of my invention has an inner, central metal conductor 12, an outer tubular metal conductor 13 and U-shaped tensile members 14—14 which suspend the inner conductor in position. The members 14 may be made from any dielectric material but I prefer them to be a polyolefin, most preferably, high density polyethylene, because of its relatively high strength and rigidity. The members 14 are flexible in the sense that they will buckle rather than act as columns to support the outer conductor on the inner conductor. Rather, they act as tensile members similar to wires in a bicycle wheel. The members 14 are in the form of monofilaments from about 10 to 40 mils in diameter, depending on the diameter of the cable. For a standard coaxial cable with a diameter under the outer conductor of 0.373 inch and an inner conductor diameter of 0.045 inch. I prefer to use monofilaments 14 about 0.020 inch thick. These members 14 are adhesively bonded to the conductors 12, 13 and, to provide a greater bonding area, each of the members 14 is flattened to broaden it at a central arc 16 and has its end portions 17—17 folded outwardly to conform with the curve of the tubular outer conductor 13 and broadened similarly to the broadening of the arc 16. To bond the U-shaped members 14 to the conductors 12, 13, adhesive may be applied to broad surfaces 16, 17. In FIGURE 1, however, a coating 18 of adhesive has been applied to the outer surface of the conductor 12 and a coating 19 has been applied to the inner surface of the conductor 13. A layer 21 of adhesive which may advantageously be the same type of adhesive as the layers 18, 19 is applied to the outer surface of the conductor 13 and serves to bond a longitudinal overlapped seam 22 in the conductor and to bond the conductor 13 to an extruded jacket 23. The jacket 23, however, is not essential to my invention and when a plurality of the coaxial cables 11 are intended to be included within a single cable core the jacket 23 may advantageously be omitted. The adhesive employed for the coatings 18, 19 must bond both to polyolefins and to metal. In this regard it should be noted that although I prefer to employ high density polyethylene for the tensile members 14 because of the relatively high rigidity, tensile strength and low dielectric constant of this material, other materials such as polypropylene, nylon, polyester, silicone, all of which may also be fiber reinforced, may be used, particularly for high temperature service, at only a small sacrifice, if any, in electrical properties. The adhesive coatings 18, 19 must, of course, be selected to bond to the particular material of the tensile members 14, and adhesives are known for all these materials. For bonding the polyethylene members 14 I prefer to employ a copolymer of polyethylene and acrylic acid described in Tomlinson's application Ser. No. 422,275, assigned to the assignee of the present invention. This adhesive is a random copolymer of ethylene and acrylic acid with about 8% acrylic acid. It is manufactured by copolymerizing ethylene and acrylic acid under high pressure, to produce a product with a melt index of about 5. It has the advantage that it is dry, and non-tacky until heated.

The dielectric constant of the adhesive layers 18, 19 measure 2.4 so that, when the cable of FIGURE 1 has a 2 mil coating 18 applied to an 0.045 inch diameter inner conductor 12, and a 2-mil coating 19 applied to an outer conductor 13 with an inside diameter of 0.373 inch, and U-members 14 with a diameter of 0.20 inch spaced at 1-centimeter intervals, the effective dielectric constant is 1.022, compared to 1.000 for air and about 1.08 for the compression-loaded, disc separator cable that has been most widely used commercially.

To manufacture the cable of FIGURE 1 (see FIGURE 3) the strand 12 which has already been coated with the adhesive layer 18 is paid from a reel 26 past a station 27 where the members 14 are applied by heated fingers 28. The fingers 28 are mounted to rotate, stepwise around the conductor 12 so that the members 14 are positioned at different locations around the circumference of the conductor. A coil 29 for inductively heating the conductor 12 to activate the adhesive 18 is positioned at the station 27 and cooling means, not shown, are provided downstream of the station 27 when required by the nature of the adhesive. The members 14 may be preformed and fed from storage to the fingers 28 or polyethylene monofilament may be paid from a reel 31 and formed at the station by an apparatus 32. It is a feature of the members 14 that they are stiff enough not to bend under their own weight and the legs of the members 14 project from the conductor 12 as it advances downstream from the station 27. A metal strip 35 is simultaneously paid from a reel 33 to form the outer conductor 13 of my cable. This conductor has already been coated with adhesive to form the coatings 19 and 21 and it is folded into tubular shape by means of a folding die 34 around the conductor 12 with its attached U-shaped members 14, in such a manner that the surfaces 17, 17 of the members 14 are pressed flat against the inside surface of the tubular conductor 13, now newly formed from the strip 32. The cable then passes into an extruder 36 where the jacket 23 is applied, the heat of the extruder bonding the broad surfaces 17, 17 to the adhesive lining 19 and also sealing the overlapped seam 22 and bonding the conductor 13 to the jacket 23. Finally, after passing through a cooling trough 37, the cable is taken up on a reel 38. Where no jacket is being applied, an induction coil 39 may be used to heat the conductor 13 for the purpose of forming an adhesive bond.

In the embodiment of my invention shown in FIGURE 2 the members 14 have been replaced by a continuous filamentary member in the form of a ribbon 41 of indefinite length. To increase the stiffness of the ribbon 41 up to the point when it is bonded to the outer conductor, it is formed in a curved section 42. In the cable of FIGURE 2 the conductor 12 is supported from the conductor 13 by the strands 43 which are segments of a loop 44 formed in the ribbon 41. A repeated series of these loops extend from the central conductor at spaced intervals around the circumference, so that the conductor 12 is supported from all directions. The outsides of the loops 41 are bonded to the conductor 13 by means of the adhesive 19 much in the manner described hereinabove for the embodiment of FIGURE 1.

Although I have illustrated the method of my invention as proceeding horizontally it will be understood that it may also proceed vertically. In the latter case the strands 14 or 43 are chosen to have enough stiffness to support their weight and a precise centering of the inner conductor will not be influenced by its stiffness.

I have invented a new and useful coaxial cable and method of manufacture of which the description has been exemplary rather than definitive and for which I desire an award of letters patents as described in the following claims.

What is claimed is:

1. A coaxial cable comprising:
   (A) an inner conductor,
   (B) an outer tubular conductor concentric to said inner conductor, and
   (C) flexible dielectric strands adhesively bonded to said outer conductor,
   (D) said inner conductor being supported within said cable substantially solely by the tension of said strands.

2. The cable of claim 1 wherein said strands are adhesively bonded to said inner conductor.

3. The cable of claim 1 comprising an adhesive coating covering substantially the entire inside surface of said outer conductor.

4. The cable of claim 1 wherein said outer conductor comprises an overlapped, adhesively bonded seam.

5. The cable of claim 2 wherein said strands comprise a plurality of individual U-shaped members.

6. The cable of claim 1 wherein said strands comprise segments of a plurality of loops of a continuous filamentary member wherein one end of each of said loops supports said inner conductor.

7. The cable of claim 1 wherein said strands are polyolefin.

8. The method of making a coaxial cable comprising the steps of:
   (A) continuously advancing a central conductor of indefinite length from a supply of said central conductor,
   (B) radially extending a plurality of tensile members around the entire circumference of said central conductor,
   (C) continuously forming a tubular outer conductor around said central conductor and said members, and
   (D) adhesively bonding said members to the inner surface of said outer conductor thereby supporting said central conductor in tension within said cable.

9. The method of claim 8 comprising the step of coating substantially the entire surface of said inner conductor with adhesive for bonding said members thereto.

10. The method of claim 8 comprising the step of coating substantially the entire inside surface of said outer conductor with adhesive for bonding said members thereto.

11. The method of claim 8 wherein bonding is accomplished by means of a heat sensitive adhesive and comprising the step of heating at least one of said conductors to bond said member thereto.

12. The method of claim 11 wherein said heating is performed inductively.

13. The method of forming a coaxial cable having improved electrical characteristics comprising the steps of:
   (A) advancing a central conductor of indefinite length from a supply of said conductor,
   (B) forming a plurality of U-shaped dielectric tensile members each having a central arc and two projecting legs,
   (C) adhesively bonding the central arcs of said members in spaced circumferential positions on said advancing conductor,
   (D) forming a tubular outer conductor around said inner conductor and said tensile members, and
   (E) adhesively bonding the extremities of the legs of said members to said outer conductor.

14. The method of claim 13 comprising the step of coating substantially the entire surface of said inner conductor with adhesive for bonding said members thereto.

15. The method of claim 13 comprising the step of coating substantially the entire inside surface of said outer conductor with adhesive for bonding said members thereto.

16. The method of claim 13 wherein bonding is accomplished by means of a heat sensitive adhesive and comprising the step of heating at least one of said conductors to bond said members thereto.

17. The method of claim 16 wherein said heating is performed inductively.

18. The method of forming a coaxial cable comprising the steps of:
(A) continuously advancing a central conductor,
(B) winding a continuous dielectric strand around said conductor in a series of loops forming a pattern having said conductor central therein,
(C) forming an outer tubular conductor around said central conductor and said loops, and
(D) adhesively bonding the outer extremities of said loops to said outer conductor, said strand supporting said central conductor by tension.

19. The method of claim 18 comprising the step of adhesively bonding said loops to said inner conductor.

20. The method of claim 18 comprising the steps of coating substantially the entire inside surface of said outer conductor with adhesive and heating said conductor to bond said strands thereto.

21. The method of claim 20 wherein said heating is performed inductively.

References Cited

UNITED STATES PATENTS

| | | | |
|---|---|---|---|
| 2,060,162 | 11/1936 | Boe | 174—111 X |
| 2,198,405 | 4/1940 | Cords | 174—28 |
| 2,395,872 | 3/1946 | Isenberg | 174—29 |
| 2,600,111 | 6/1952 | Isenberg | 174—29 |
| 3,309,455 | 3/1967 | Mildner | 174—107 X |

FOREIGN PATENTS

| | | |
|---|---|---|
| 691,077 | 5/1940 | Germany. |
| 489,007 | 7/1938 | Great Britain. |
| 879,712 | 10/1961 | Great Britain. |

LARAMIE E. ASKIN, *Primary Examiner.*

H. HUBERFELD, *Assistant Examiner.*